(12) United States Patent
Sallas et al.

(10) Patent No.: US 9,915,743 B2
(45) Date of Patent: Mar. 13, 2018

(54) BIO-ACOUSTIC SENSING DEVICE AND METHOD FOR MARINE SEISMIC SURVEY

(71) Applicant: SERCEL, Carquefou (FR)

(72) Inventors: John Sallas, Plano, TX (US); Simon Vallez, Brest (FR)

(73) Assignee: SERCEL, Carquefou (FR)

( * ) Notice: Subject to any disclaimer, the term of this patent is extended or adjusted under 35 U.S.C. 154(b) by 193 days.

(21) Appl. No.: 14/873,736

(22) Filed: Oct. 2, 2015

(65) Prior Publication Data

US 2016/0131783 A1    May 12, 2016

Related U.S. Application Data

(60) Provisional application No. 62/076,888, filed on Nov. 7, 2014.

(51) Int. Cl.
*G01V 1/36* (2006.01)
*G01V 1/38* (2006.01)
*G01V 1/00* (2006.01)

(52) U.S. Cl.
CPC ............... *G01V 1/36* (2013.01); *G01V 1/001* (2013.01); *G01V 1/38* (2013.01); *G01V 2210/59* (2013.01)

(58) Field of Classification Search
CPC . G01V 1/001; G01V 1/36; G01V 1/38; G01V 2210/59
USPC ..................................................... 367/15, 23
See application file for complete search history.

(56) References Cited

U.S. PATENT DOCUMENTS

| 4,509,151 | A | 4/1985 | Anderson |
| 7,974,151 | B2 | 7/2011 | Iranpour et al. |
| 8,619,417 | B1 | 12/2013 | Helton |
| 8,780,670 | B2 | 7/2014 | Iranpour et al. |
| 8,789,670 | B2 | 7/2014 | Antchak et al. |
| 8,937,847 | B2 | 1/2015 | Ayela et al. |
| 8,947,973 | B2 * | 2/2015 | Groenaas (Gronaas) ............. G01V 1/001 367/15 |
| 9,625,592 | B2 * | 4/2017 | L'Her ..................... G01V 1/001 |
| 2009/0251991 | A1 | 10/2009 | Ayela et al. |
| 2010/0067326 | A1 | 3/2010 | Iranpour et al. |
| 2013/0201791 | A1 | 8/2013 | Parkes et al. |
| 2014/0036624 | A1 | 2/2014 | Tonchia |
| 2014/0043937 | A1 | 2/2014 | Teyssandier et al. |
| 2014/0192617 | A1 | 7/2014 | Ayela et al. |

OTHER PUBLICATIONS

International Search Report and Written Opinion in corresponding International Application No. PCT/IB2015/002291 dated Mar. 10, 2016.

* cited by examiner

*Primary Examiner* — Ian J Lobo
(74) *Attorney, Agent, or Firm* — Patent Portfolio Builders PLLC

(57) ABSTRACT

A method and marine seismic processing system including an interface for receiving recorded data, wherein the recorded data includes seismic data and bio-acoustic data; a seismic data processor for estimating a source signature from the recorded data, wherein the source signature is associated with a seismic source that emits seismic waves in water during a seismic survey; and a bio-acoustic processor that estimates a presence of a mammal generating the bio-acoustic data, based on a processed signal obtained by removing the source signature from the recorded data.

20 Claims, 16 Drawing Sheets

BIO-ACOUSTIC SENSING DEVICE AND METHOD FOR MARINE SEISMIC SURVEY

CROSS-REFERENCE TO RELATED APPLICATIONS

This application is a continuation of, and claims priority from, U.S. Patent Application No. 62/076,888, filed on Nov. 7, 2014, entitled "Bio-acoustic Sensing Device and Method for Marine Seismic Survey", the disclosure of which is incorporated here by reference.

BACKGROUND

Technical Field

Embodiments of the subject matter disclosed herein generally relate to methods and systems for collecting seismic data in a marine environment and, more particularly, to mechanisms and techniques for detecting the presence of marine mammals and mitigating their exposure to undesired sound levels generated by a seismic source.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

For marine acquisition, a seismic acquisition system 100 includes, as illustrated in FIG. 1, a vessel 102 that tows plural streamers 110 (only one is visible in the figure) and a seismic source array 130. Streamer 110 is attached through a lead-in cable (or other cables) 112 to vessel 102, while source array 130 is attached through an umbilical 132 to the vessel. A head float 114, which floats at the water surface 104, is connected through a cable 116 to the head end 110A of streamer 110, while a tail buoy 118 is connected, through a similar cable 116, to the tail end 110B of streamer 110. Head float 114 and tail buoy 118 are used, among other things, to maintain the streamer's depth. Seismic sensors 122 are distributed along the streamer and configured to record seismic data. Seismic sensors 122 may include a hydrophone, geophone, accelerometer or a combination thereof. Positioning devices 128 (also known as birds) are attached along the streamer and controlled by a controller 126 for adjusting a position of the streamer according to a survey plan.

Source array 130 has plural source elements 136 like air guns. The source elements are attached to a float 137 to travel at desired depths below the water surface 104. The source elements attached to float 137 form a sub-array. Source array 130 may have multiple sub-arrays, typically three. Traditionally, vessel 102 tows two source arrays 130 and 130', which may be identical. During operation, vessel 102 follows a predetermined path T while source elements (usually air guns) 136 emit waves 140. These waves bounce off the ocean bottom 142 and other layer interfaces below the ocean bottom 142 and propagate as reflected/refracted waves 144, which are recorded by sensors 122. The positions of both source elements 136 and recording sensors 122 may be estimated based on GPS systems 124 and recorded together with the seismic data in a storage device 127 onboard the vessel. Controller 126 has access to the seismic data and may be used to achieve quality control or even fully process the data. Controller 126 may also be connected to the vessel's navigation system and other elements of the seismic survey system, e.g., positioning devices 128.

However, the frequency content of impulsive sources is not fully controllable and, thus, different sources need to be selected, depending on the needs of a particular survey. In addition, the use of impulsive sources can pose certain safety and environmental concerns, as will be discussed later.

Thus, another class of sources that may be used is vibratory sources. An example of a vibratory source is disclosed, for example, in U.S. Pat. No. 8,830,794, the entire content of which is incorporated herein by reference. For vibratory sources, the source signal excitation is typically a sweep, a swept frequency sine wave excitation signal over a pre-determined sweep bandwidth for a predetermined time interval. Other excitation signals are possible, for example, band limited pseudorandom signals as taught in U.S. Pat. No. 8,619,417 that may be continuous or semi-continuous emissions.

Typically, after some instrument reset period and/or listen time, the sweep is repeated, to start a new recording for the new source/receiver position. Thus, a typical raw record includes both sweep and listen time. Correlation or source signature deconvolution may be employed to collapse the data to produce a record that is similar to what might be obtained using an impulsive source.

The technique of using a vibratory source followed by correlation to collapse the data is called in the art Vibroseis. The survey configuration is identical to that is shown in FIG. 1, except in this case source array 130 represents a vibratory source array.

When a conventional impulsive source (e.g., air gun) is fired, it generates a powerful underwater air bubble that oscillates for a couple of seconds, thus generating sound waves. Similar sound waves are generated by a vibratory source, with the difference that the various frequencies are generated sequentially in time and not all at the same time as for the impulsive source array. Also, a vibratory source generates sound waves with less peak intensity than the impulsive source.

These sound waves propagate through the water toward the ocean bottom as illustrated in FIG. 1. However, some of the energy associated with these sources propagates as a sound wave 150, substantially parallel to the water surface 104, with the potential of interfering with activities of a marine mammal 152 (also called "mammal" herein). To prevent this kind of situations, the seismic surveys are regulated by various national and international bodies that require that marine mammal activity is monitored and protected from harmful sound waves.

More specifically, international and national regulations in this regard and the recommendations of competent bodies encourage marine seismic operators to carry out, in parallel to their measurement campaign, continuous monitoring for detecting the possible presence of marine mammals in the exploration zone.

This monitoring is currently carried out either visually by one or more human operators and/or using an independent system of acoustic receiver or receivers fulfilling functions of passive detection, classification and geographical location of the marine mammal or mammals. In this regard, U.S. Pat. Nos. 7,974,151 and 8,937,847, the entire content of which is incorporated herein by reference, disclose such mammal detection systems. Once a marine mammal is detected within an exclusion zone centered on the seismic source, current regulations require that the seismic source is stopped or moved away from the mammals.

These acoustic systems 160, commonly referred to as Passive Acoustic Monitoring (PAM), are also towed by the streamer vessel 102 as illustrated in FIG. 1. PAM system 160, which is also shown in FIG. 2 in more detail, includes acoustic receivers 122' distributed along one or more antennas 110' dedicated to this function. A telemetry system (not shown) transmits the data recorded by sensors 122' to a remote controller (i.e., processing unit) 126, located for example on the seismic vessel. Alternatively, mammal sensors 122' may be integrated with seismic sensors 122 into the same streamer 110 as shown in FIG. 2. In other words, the existing PAM systems are deployed together with, or in parallel to the seismic streamers.

However, these practices have the following possible disadvantage: if a vibratory source is used for generating the sound waves, the existing PAM systems may not distinguish the mammal's signature from the source generated sound waves because there is an overlap in the mammal spectrum, which is about 10 Hz to 200 kHz, and the seismic vibrator signals, which ranges from 2-200 Hz. Because both the impulsive source's signals and the vibratory source's signals may last for seconds, they may mask the entire mammal signature.

Thus, there is a need to improve or come up with a new PAM system that avoids the above noted disadvantages, and especially is capable of detecting mammals when a vibratory source is used.

SUMMARY OF THE INVENTION

According to an exemplary embodiment, there is a marine seismic processing system that includes an interface for receiving recorded data, wherein the recorded data includes seismic data and bio-acoustic data, a seismic data processor for estimating a source signature from the recorded data, wherein the source signature is associated with a seismic source that emits seismic waves in water during a seismic survey, and a bio-acoustic processor that estimates a presence of a mammal generating the bio-acoustic data, based on a processed signal obtained by removing the source signature from the recorded data.

According to another embodiment, there is a seismic acquisition system that includes a vessel, at least one streamer, seismic sensors distributed along the at least one streamer, and a processing system including a seismic data processor and a bio-acoustic processor. The seismic data processor estimates a source signature from the recorded data, wherein the source signature is associated with a seismic source that emits seismic waves in water during a seismic survey. The bio-acoustic processor estimates a presence of a mammal generating the bio-acoustic data, based on a processed signal obtained by removing the source signature from the recorded data.

According to another exemplary embodiment, there is a method for acquiring seismic data and detecting a mammal. The method includes generating with a seismic source a seismic wave, recording data with seismic sensors, wherein the data includes seismic data and bio-acoustic data; processing the data in a bio-acoustic processor to obtain the bio-acoustic data, wherein the processing removes a signal associated with the seismic source's signature; and determining a presence of a mammal based on the bio-acoustic data.

According to still another exemplary embodiment, there is a computer readable medium including computer executable instructions, wherein the instructions, when executed by a processor, implement instructions for separating mammals' related sound waves from seismic data. The instructions implement the method steps discussed above.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an acquisition system that uses the seismic sensors for recording both seismic data and bio-acoustic signals related to a marine mammal. However, the embodiments to be discussed next are not limited to such seismic system, but may be implemented when a separate PAM system is used, or when the seismic sensors are not mounted inside the streamer.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a marine processing system that includes a seismic data processing sub-system and a bio-acoustic data processing sub-system. Recorded data (recorded with seismic sensors) is processed in the bio-acoustic data processing sub-system for detecting a presence of a mammal. An estimate of the seismic source's signal used to generate the seismic data is calculated and used to remove a source signature from the data to increase an accuracy of the mammal's detection. Alternatively, or in addition, this process may be used to reduce the false detection (false alarm) of the mammals.

According to another embodiment, there is a seismic processing system that includes plural processing channels for receiving and conditioning recorded data, plural splitters for splitting outputs of the processing channels into first and second streams, a seismic data processor for processing the first streams, and a bio-acoustic processor for processing the second streams to detect a presence of a mammal. The plural processing channels may be physically located inside a marine seismic streamer when the same sensors are used to record the seismic data and the bio-acoustic data. In another embodiment, when dedicated seismic sensors are used to record the seismic data and part of the bio-acoustic data and dedicated bio-acoustic sensors are used to record another part of the bio-acoustic data, the plural processing channels may be distributed inside the streamers or inside other components of the seismic system (e.g., bio-acoustic streamers that are separated from the seismic streamers).

Figure 3A:
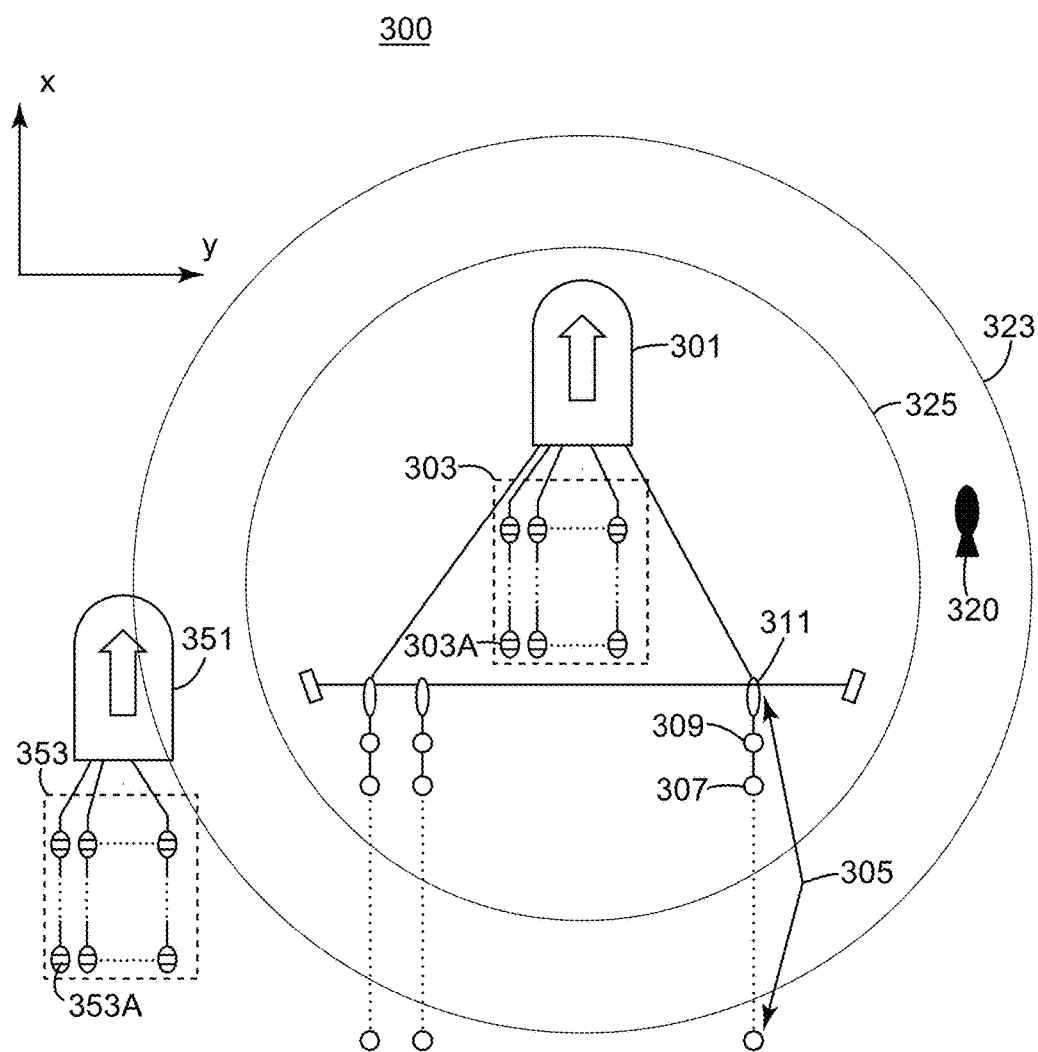
FIG. 3A illustrates a marine seismic survey system that uses different seismic sensors for recording seismic data and bio-acoustic data.

According to another embodiment illustrated in FIG. 3A, an acquisition system 300 includes a vessel 301 that tows a source array 303 at a given depth. Vessel 301 also tows streamers 305 that include seismic sensors 307 and bio-acoustic sensors 309. In this embodiment, the seismic and bio-acoustic sensors are different. For example, the seismic sensors 307 are hydrophones having a frequency response in the range of 1 to 10 kHz while the bio-acoustic sensors 309 are hydrophones in the range of about 1 to 200 kHz. In one embodiment, for practical reasons, the number of seismic sensors 307 may be in the thousand or tens of thousands while the number of bio-acoustic sensors 309 may be in the tens or hundreds. Thus, the data recorded by sensors 307 includes both seismic data (data in the range of 1 to 200 Hz) and bio-acoustic data (data in the range of kHz) and it is called herein recorded data while the data recorded by the bio-acoustic sensors 309 includes mainly bio-acoustic data.

Figure 1:
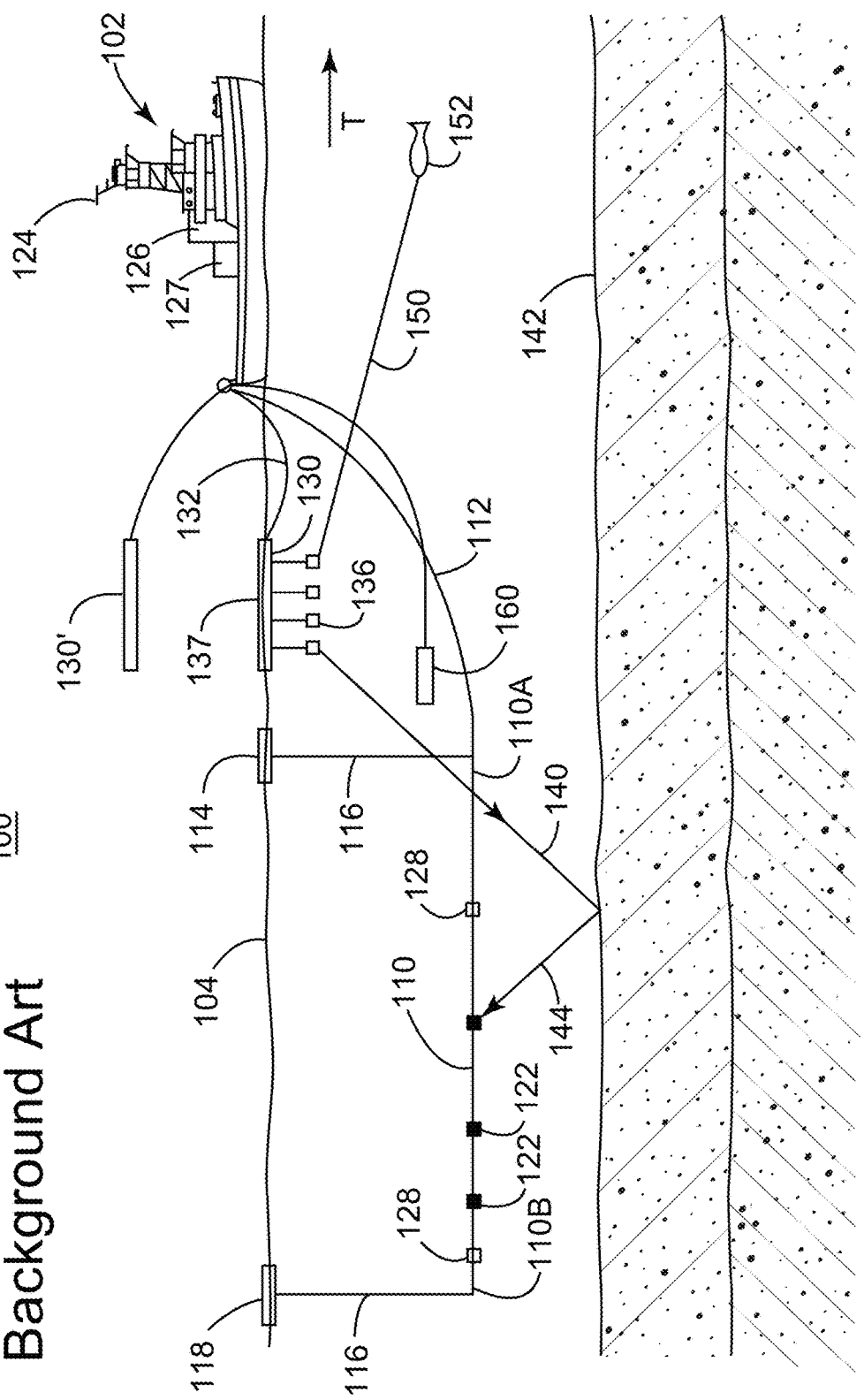
FIG. 1 illustrates a marine seismic survey system.
Figure 2:
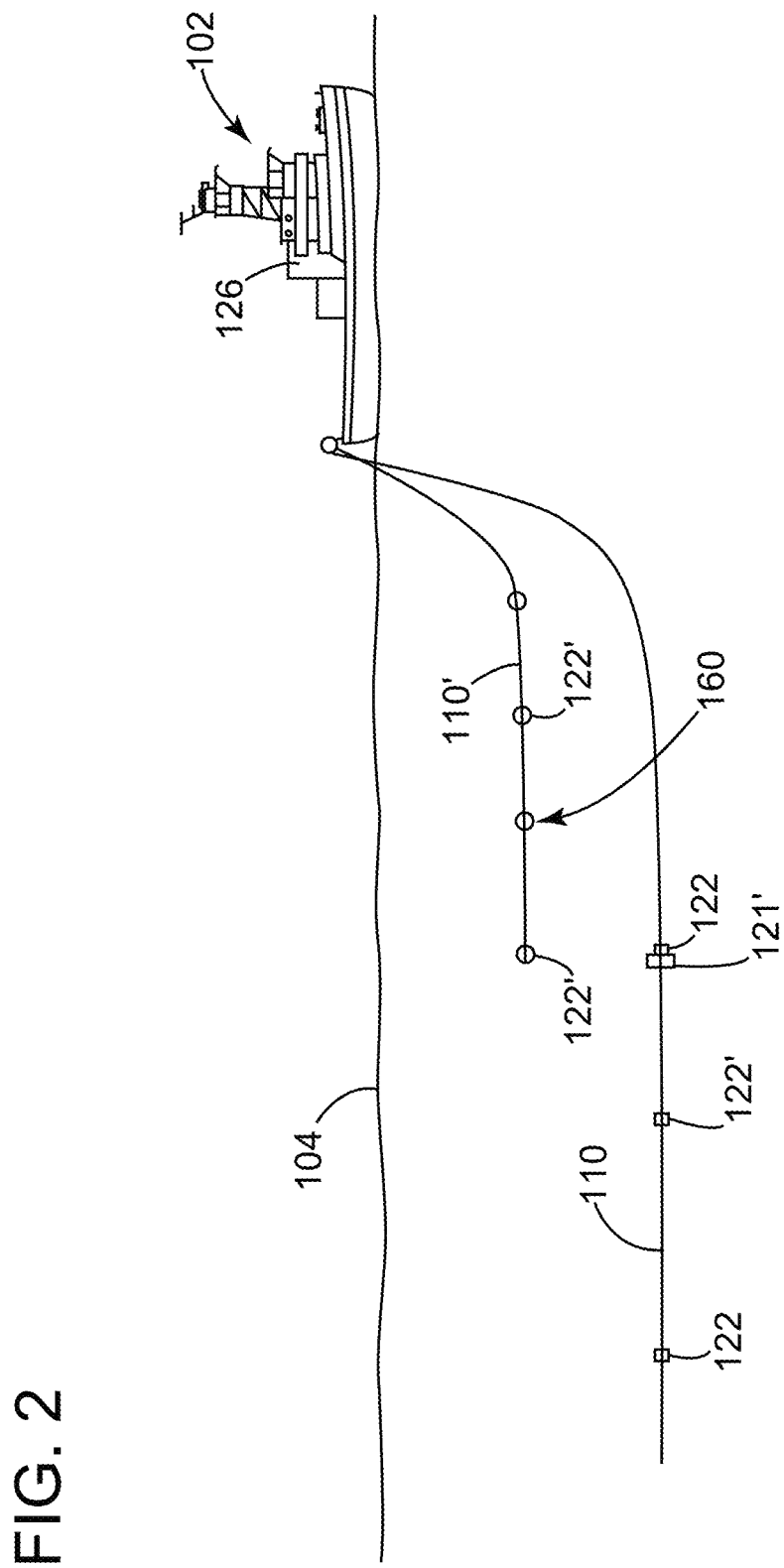
FIG. 2 illustrates a traditional PAM system.

The bio-acoustic sensors 309 may be integrated in the seismic streamer as illustrated in FIG. 3A. However, the bio-acoustic sensors may also be attached, externally, to the streamer 305, or they may be located on their own dedicated streamers, as illustrated in FIG. 2. Seismic sensors 307 may include hydrophones, geophones, accelerometers or a combination thereof. Bio-acoustic sensors 309 may be similar to seismic sensors 307. However, in one embodiment, the bio-acoustic sensors may be built to be more sensitive to the frequency spectrum emitted by the mammals.

An additional source array 353 may be towed by a separate source vessel 351, and the additional source array 353 may be offset on both the inline X direction and the cross-line Y direction compared to the source array 303. Source array 353 may be fired independently or time delayed from source array 303. Source arrays 303 and/or 353 may include one or more source elements 303A and/or 353A, which are vibratory sources. In one embodiment, all source arrays in the seismic survey system are vibratory sources. In another embodiment, the source arrays include a combination of vibratory and impulsive sources. FIG. 3A also shows each streamer 305 having a corresponding head buoy 309, which may host various equipment, e.g., a GPS system. A marine mammal 320 is shown in FIG. 3A being inside a detection area 323, but outside a protection zone 325.

The most widely used seismic sensor 307 for the streamers of the seismic surveys is the hydrophone. Because a hydrophone records analog signals, many seismic streamers are equipped with analog-to-digital converters that convert the analog output of the streamer's hydrophones into a digital value. The bandwidth of the hydrophone is much greater than the bandwidth of seismic data. For example, the bandwidth of the seismic data is typically limited to frequencies below 200 Hz, while hydrophones are typically sensitive over frequency ranges that extend well into the kHz range. The analog to digital converters in existing streamers are based upon over-sampling schemes that employ delta-sigma modulation in combination with decimation filters to extend resolution at a reduced sample rate. Other types of analog to digital converters can be used.

The PAM systems may employ special bio-acoustic sensors that can be hung from streamers, from sources, from buoys, from the vessel (e.g., pinger pole), from deflectors, or integrated into the seismic streamer itself (as illustrated in FIG. 3A) to record the bio-acoustic signals. A bio-acoustic signal is considered in the following to be any signal generated by a marine mammal. A seismic signal is considered to be generated by reflections and/or refractions of sound waves at various interfaces in the subsurface. The bio-acoustic sensors are mainly separate sensors that listen for mammal signals. The PAM detection systems are based upon the presence of signals whose spectral content falls within a certain frequency band, see, for example, U.S. Pat. No. 4,509,151.

Figure 3B:
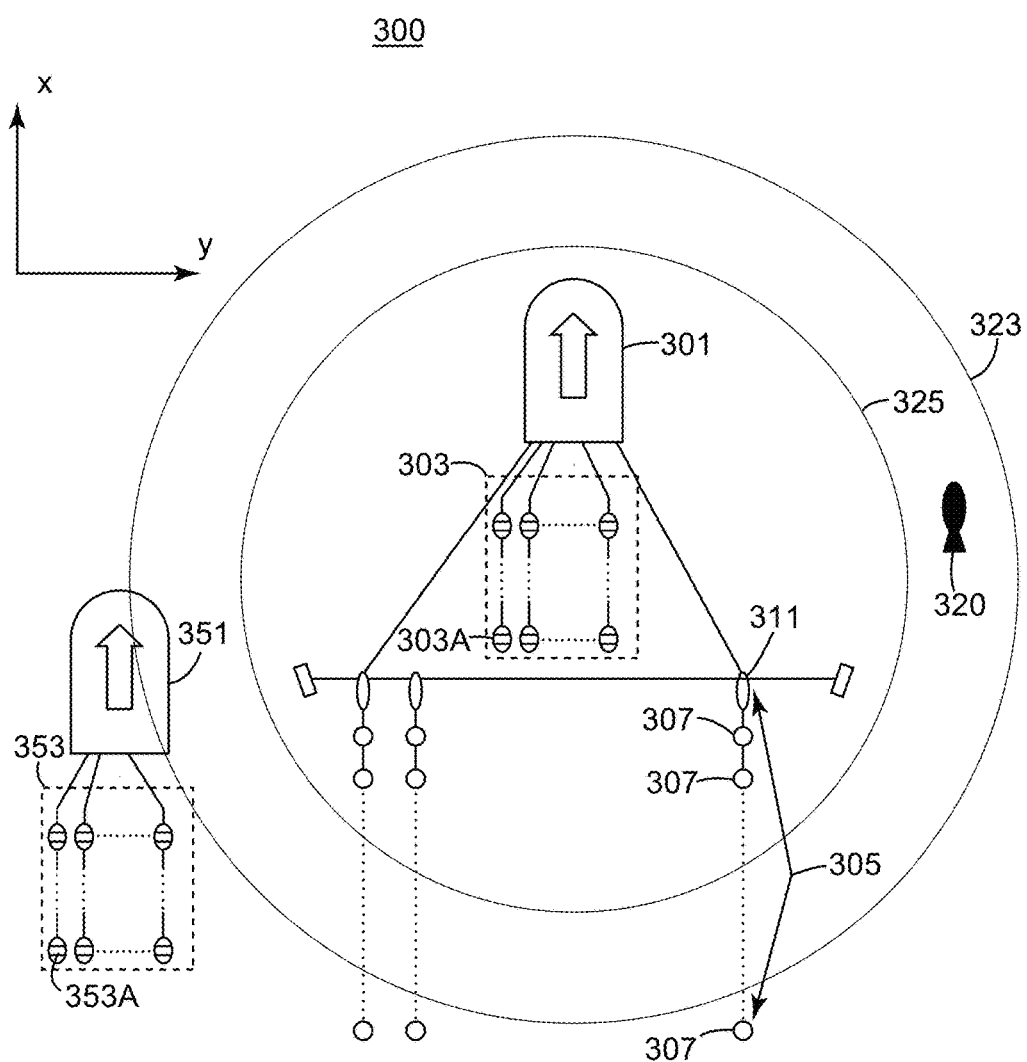
FIG. 3B illustrates a marine seismic survey system that uses the same sensors for recording the seismic data and the bio-acoustic data.

Instead of using two separate sets of sensors 307 and 309, as illustrated in FIG. 3A, one for recording the seismic data and one for recording the bio-acoustic data, it would be advantageous and simpler to use a single set of sensors 307, as illustrated in FIG. 3B, to record both type of data. The recording of both types of data can happen simultaneously. Such a system that utilizes a single sensor for both seismic and bio-acoustic signals will reduce the cost of the acquisition system. However, in particular with this simplified configuration illustrated in FIG. 3B, the processing system should be capable of separating the bio-acoustic data from the data to be used for seismic processing and this processing system is discussed with regard with FIG. 4A.

Figure 4A:
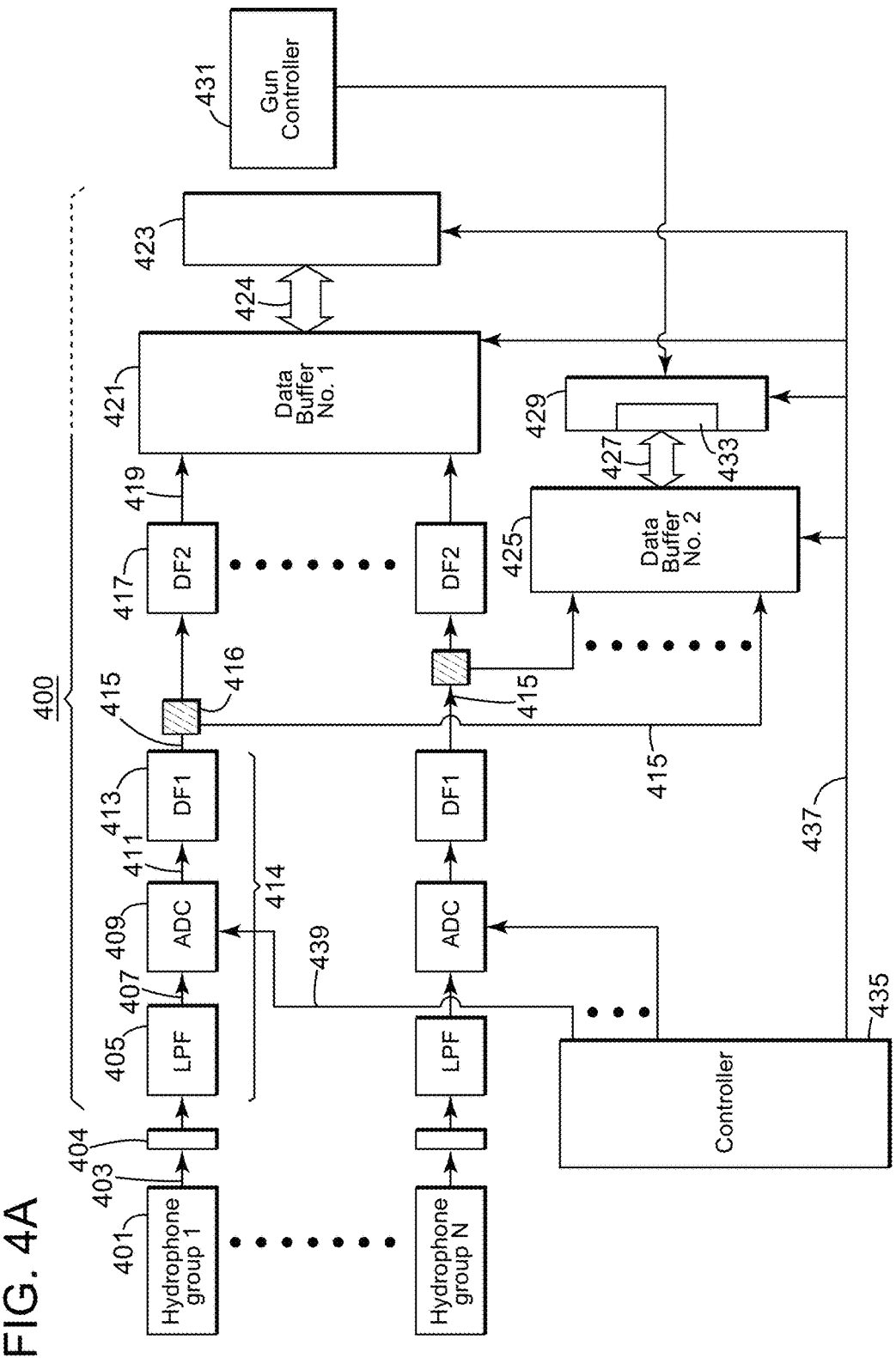
FIG. 4A is a schematic diagram of a processing system for processing the seismic and bio-acoustic data when recorded with the same sensors.

FIG. 4A schematically illustrates a processing system 400 that separates recorded data into two streams and independently conditions each stream to be appropriate for seismic processing and/or bio-acoustic processing. Note that processing system 400 may include both hardware and software elements, as shown in FIG. 4A, and also the extent of the processing system may vary as illustrated by the dotted part of the line corresponding to reference number 400. These details would be discussed later. Although FIG. 4A appears to show that all the seismic sensors (e.g., hydrophones) of a streamer are used for both seismic and bio-acoustic data collection, this is not the case. While it is possible to have all the seismic sensors involved in both seismic and bio-acoustic data collection, it is also possible to have a sub-set of the seismic sensors collecting seismic data or bio-acoustic data or both. Alternatively, it is possible that only the signals from a sub-set of the seismic sensors are used for the processing illustrated in FIG. 4A. This means that the number N of channels illustrated in FIG. 4A may be between one and the maximum number of seismic sensor groups.

FIG. 4A shows N groups of sensors (hydrophones for simplicity) 401 that generate analog signals 403. Individual sensors 307 may be electrically connected together to form such a group, in a streamer, for enhancing the signal-to-noise ratio, although each individual sensor is located at a unique position along the streamer. If this is the case, a group of sensors are considered to generate a single signal. However, it is possible to collect from each sensor 307 its individual signal and to apply the conditioning to be discussed next per sensor instead of per group of sensors.

Because the acoustic bandwidth of sensor group 401 extends well into the kHz range, the analog signal 403 includes energy from both the seismic waves and the bio-acoustic waves. In this regard, note that mammals typically communicate using calls, whistles, click trains and other songs that fall in the range of 10 Hz to 200 kHz while seismic data typically falls in the frequency band of 2-200 Hz. Analog signal 403 is fed through an interface 404 to a low-pass filter 405. Filter 405 may be an anti-alias low pass filter, which has a corner frequency well above the frequencies of interest (for example at 100 kHz). This means that filter 405 removes all the frequencies which are not of interest above the corner frequency. Filtered signal 407 is then fed to an analog to digital (ADC) converter 409 to be digitized. Signal 407 may be digitized using, any analog to digital scheme. One preferred scheme is the Sigma-Delta ADC, which essentially transforms the voltage of the analog signal into frequency in the digitized signal. Other types of ADC, such as flash converters, successive approximation or other types, may be used as will be recognized by those skilled in the art.

ADC 409 is configured to oversample signal 407 by a large factor. Generally, a smaller number of bits than required are converted using a flash ADC after the filter 405 or, in the simplest case, a two-level quantization is performed with bit output stream 411. A digital filter 413 (which can be a combination of (1) a digital filter to reduce quantization noise and (2) a decimation filter) follows the ADC 409. Digital filter 413 reduces the sampling rate and filters off unwanted noise signal and increases the resolution of the output 415. For example, input signal 411 may have only one-bit of resolution, but it may be sampled at 16 MHz, while after the first decimation filter 413, the output signal 415 may have a resolution of 18 bits and a sample rate of 16 kHz. The bandwidth of signals that may be represented at output 415 is limited by the Nyquist frequency of 8 kHz. Elements 405, 409 and 413 form a processing path, which is called herein processing channel 414. According to this definition, a processing channel 414 is a device that conditions input data that includes both seismic data and bio-acoustic data.

Output signal 415 is then split in splitter 416, with one leg connected to data buffer 425, which holds the high-bandwidth signal sampled at a high sample rate and can be accessed by the bio-acoustic processor/detector 429 through data link 427. Data buffer 425 may be any digital storage system. The other leg of output 415 continues on to a second digital filter 417, which can be a combination of (1) a digital filter to reduce quantization noise and (2) a decimation filter. The output 419 from the second digital filter 417 is a lower bandwidth, higher resolution representation of the received signal. For example, signal 419 may have a resolution of 24 bits at a 500 Hz sample rate, which is adequate for representing seismic signals that fall in the 2-200 Hz range. Data signal 419 may then be stored in a data buffer 421. A seismic data processor 423 may be part of the processing system 400 and it is configured to access the seismic data 419 in data buffer 421, through data link 424, and to determine various quality parameters associated with the seismic survey part, e.g., determining the status of the sensors, the status of the birds, and/or generating quick estimates of the surveyed subsurface for determining the accuracy of data collection. The sampling time and overall control of the ADC's, digital filters and data transfers may be coordinated by a global controller 435, through links 437. Global controller 435 may also be connected to ADC 409 by links 439 for controlling the digitizing process. Global controller 435 may be implemented as a processor or discussed later with regard to FIG. 8.

Figure 5:
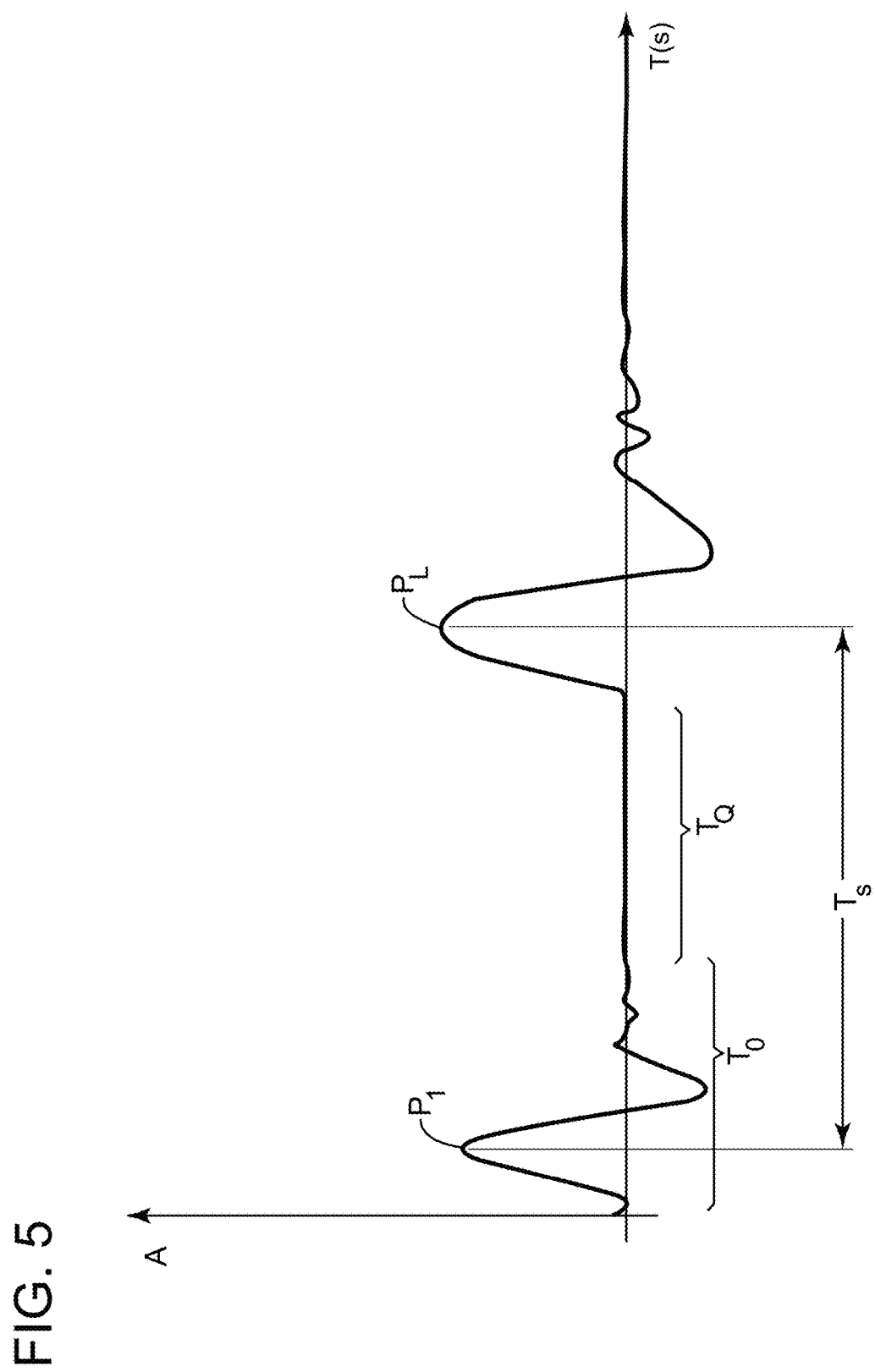
FIG. 5 is a graph illustrating the sound waves generated by an impulsive source.

The processing system 400 illustrated in FIG. 4A can be configured to further condition the signal 415, which is stored in data buffer 425, so that it is appropriate for mammal detection. In this regard, bio-acoustic processor 429 may be configured, for example, in software, to ignore a first part of each signal stored in data buffer 425. For example, if the sources used by the seismic acquisition system are impulsive sources, they create high-amplitude acoustic waves whose high-frequency content is of very short duration (on the order of ms) as illustrated in FIG. 5. FIG. 5 shows two shots having corresponding high-peaks P1 and P2. It is noted, that shortly after the peak, the amplitude of the released energy decays to almost zero. Typically, air gun sources are fired about every 10 to 20 s, i.e., at a time interval $T_S$. Thus, there is an interval of time $T_Q$ between shots, when there is little activity or energy coming directly from the sources. In one application, bio-acoustic processor 429 can receive commands from a source controller 431 (which is traditionally located next to the source or on the vessel) to ignore signals received over a short time interval $T_0$ after the air-guns are fired, because the noise introduced by the source is too strong for being able to detect the mammal's presence.

For the case of marine vibrator sources, which emit signals of long duration or even continuously, the above discussed option of ignoring the signals during the time period $T_0$ is not viable. For this case, a novel way to remove the source signal before undergoing analysis for the presence of bio-acoustic signals is now discussed.

Figure 4B:
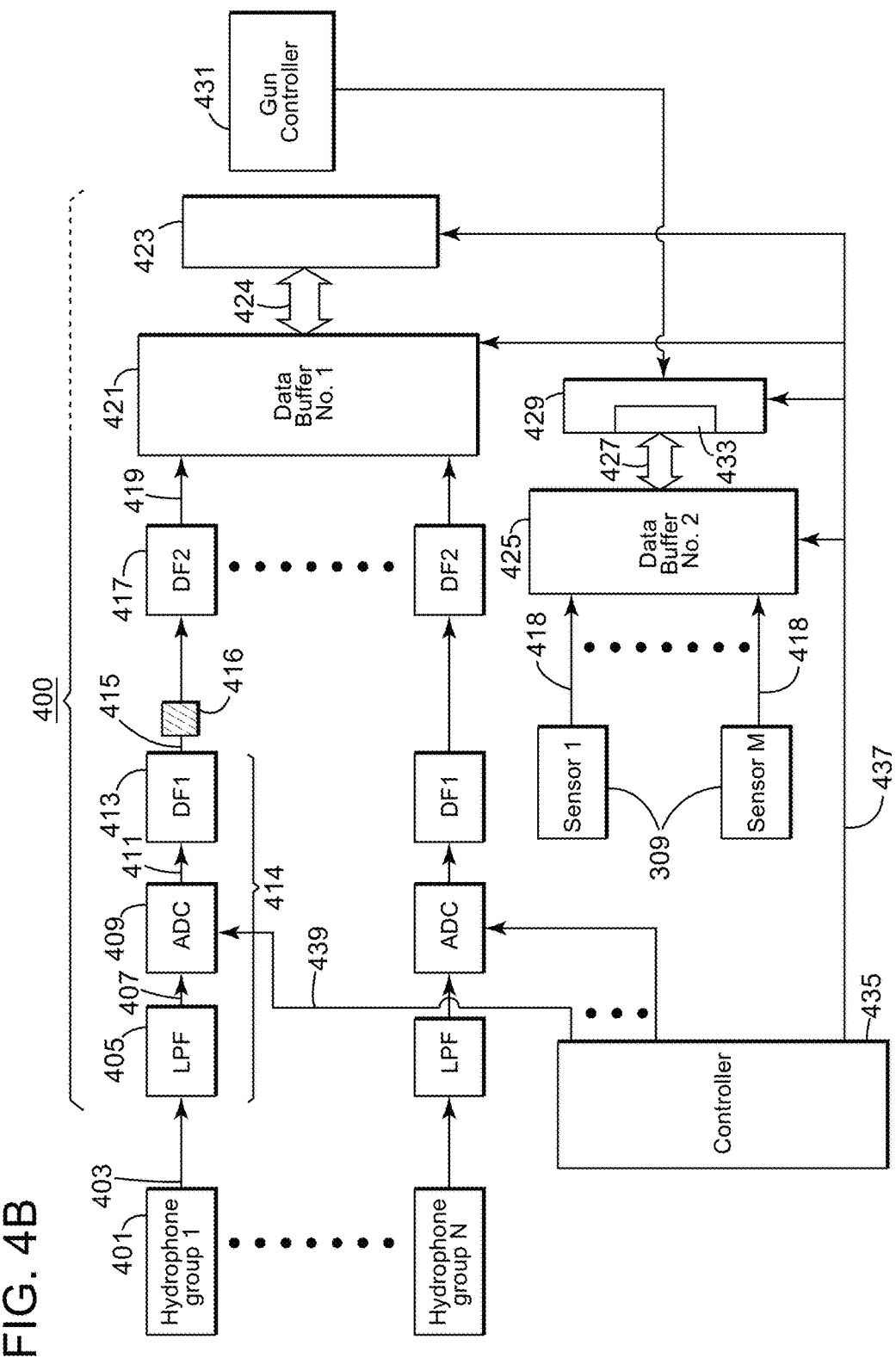
FIG. 4B is a schematic diagram of a processing system for processing the seismic and bio-acoustic data when recorded with different sensors.

The embodiment discussed in FIG. 4A assumes that the same sensors 307 are used for recording the seismic and the bio-acoustic signals. However, according to another embodiment illustrated in FIG. 4B, different sets of sensors may be used to record the seismic and bio-acoustic signals. FIG. 4B shows that bio-acoustic sensors 309 record bio-acoustic data, which is provided as bio-acoustic signals 418 directly to data buffer 425. While the processing channels 414 are unchanged for the data received from the seismic sensors 401, the bio-acoustic data recorded by the bio-acoustic sensors 309 follows a different path from the seismic data, as illustrated in FIG. 4B. Note that the number N of hydrophones for recording the seismic data is different from the number M of bio-acoustic sensors, where N and M can take any values.

Irrespective of which implementation is chosen for the hardware associated with the seismic and bio-acoustic signals, i.e., the embodiment of FIG. 4A or the embodiment of FIG. 4B, various processing schemes may be used for processing the recorded data for removing energy associated with the seismic signals, as now discussed.

Figure 6A:
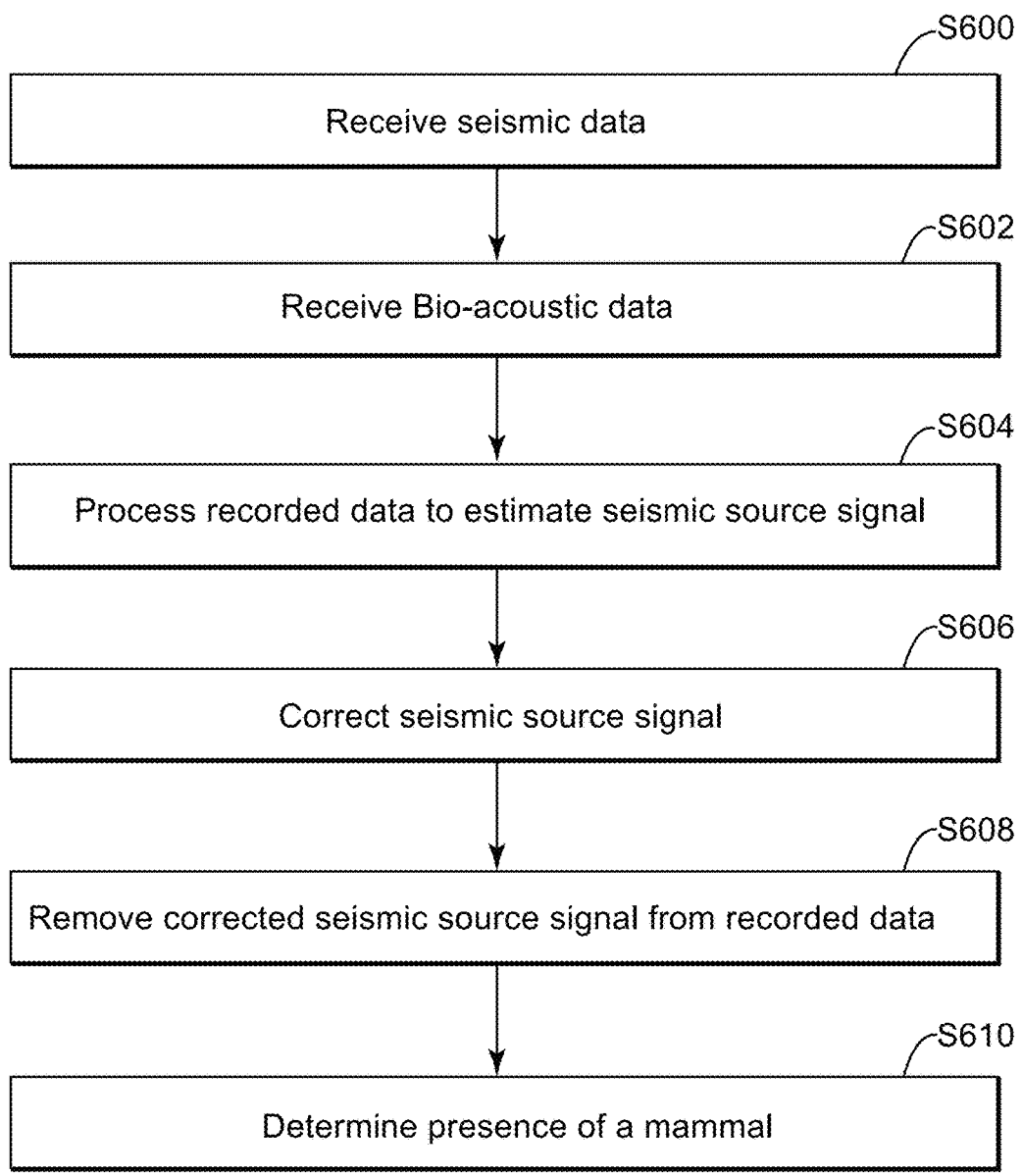
FIG. 6A is a flowchart of a process for removing source related data from bio-acoustic data.

In one embodiment discussed with regard to FIG. 6A, the bio-acoustic processor 429 includes a source signature filter module 433 (see FIGS. 4A and 4B) that is configured to receive signals 415 or 418, for example, from data buffer 425 along link 427, for pre-bio-acoustic analysis. Signals 415 and/or 418 may contain spectral components extending from about 10 Hz up to about 10 kHz, which are commonly found in calls, whistles and songs of marine mammals. The source signature filter module may be a hardware module (i.e., dedicated circuitry implemented in the bio-acoustic processor 429), a software module (i.e., plural commands stored in the bio-acoustic processor 429) or a combination of the two. The bio-acoustic signals may be recorded by seismic sensors 307 as discussed with regard to FIG. 4A, or come from other independent sensors 309 that are integrated within a seismic streamer, attached to the streamer, to the seismic source, suspended from buoys or from a vessel as discussed with regard to FIG. 4B. Source signature filter 433 removes from the received signals 415 or 418 (depending on which embodiment is selected), energy that is coherent with the seismic source before detecting the presence of the mammal in the bio-acoustic processor 429.

For example, for the embodiment illustrated in FIG. 4B, it is possible to process the signals 415 (bandlimited for example at about 200 Hz) based on channels 414, second digital filter 417, data buffer 421 and seismic data processor 423 as now discussed with regard to FIG. 6A.

Depending on the sensibility of seismic sensors 401, signals 415 may include both seismic data and bio-acoustic data. If this is the case, digital filter 417 has the purpose to modify signal 415 to make it more appropriate for seismic data analysis. Thus, the output signal 419 of digital filter 417 can be considered to include mostly seismic data. Therefore, as illustrated in FIG. 6A, in step S600, the seismic data processor and/or the bio-acoustic processor receives seismic data 419. In step S602, the bio-acoustic data is received, i.e., signal 418. In one embodiment, the seismic data is recorded together with the bio-acoustic data in the same set of recorded data, i.e., the same seismic sensors are used for recording the data. In step S604, the seismic data is processed, if available, the result of which may be then used to estimate the seismic source signature. Alternatively, if the recorded data 401 includes both the seismic data and the bio-acoustic data, the recorded data is processed to determine the seismic source signature. There are many algorithms in the art that are used to process the seismic data for obtaining signals associated with the seismic source signature. The estimated seismic source signature may be further processed in step S606, in the seismic data processor 423 or controller 435 or bio-acoustic processor 429. This processing may include interpolation, resampling and/or correction so that the estimated seismic source signature is compatible with the bio-acoustic signals 418. Then, one of the above noted processors may be configured to remove in step S608 the processed seismic source signal from the recorded data 403 for obtaining the bio-acoustic data. In this way, it is possible to remove the source signature from the recorded data to obtain a more accurate bio-acoustic data. This result can be achieved by using independent sets of sensors for collecting the recorded data and the bio-acoustic data or using a single set of sensors for collecting both the seismic and bio-acoustic data sets. Based on the result of step S608, the bio-acoustic processor 429 can analyze the corrected data for determining the presence of a mammal. While this process has been discussed with regard to the embodiment illustrated in FIG. 4B, the same process may be modified to fit the embodiment of FIG. 4A or other similar embodiments.

Figure 6B:
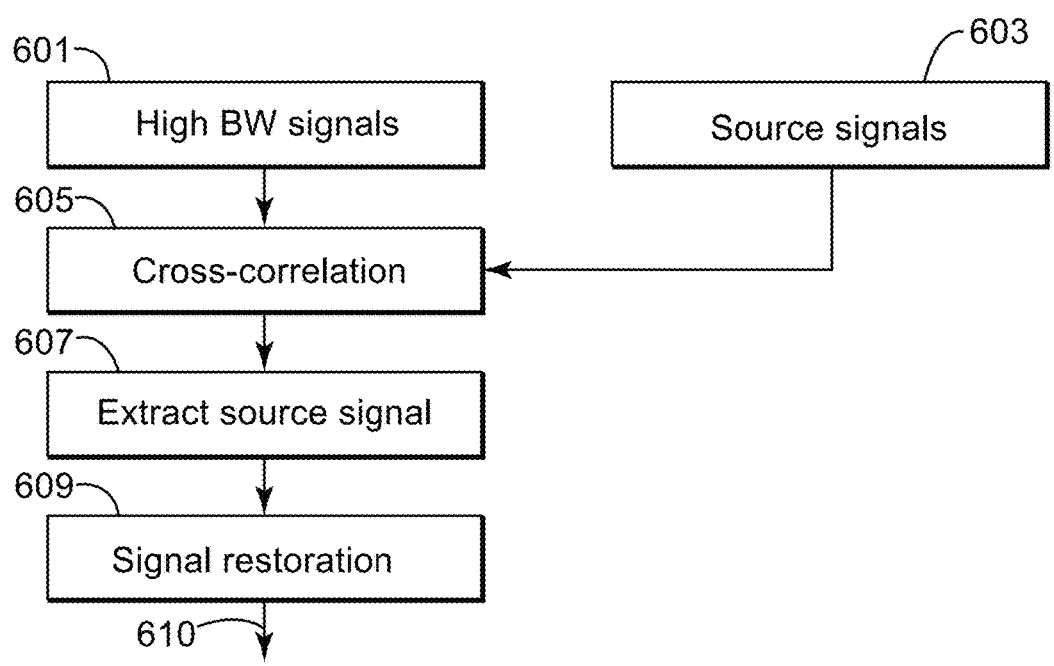
FIG. 6B is a flowchart of a process for removing source related data from the recordings of the seismic sensors.

A process that may be implemented in the source signature filter 433 for removing energy generated by the seismic source (i.e., the source signature) is illustrated in FIG. 6B. Source signature filter 433 accesses a data signal array 601, which corresponds to a subset of the data that resides in data buffer 425. For example, the data signal array 601 may contain digital versions of signals recorded over the previous 16 s. The multi-channel signals in data signal array 601 are cross-correlated in step 605 with seismic source signals 603. Seismic source signals 603 may be pilot signals, drive signals or measured source output signals, for example, projector piston acceleration measurements for a vibratory source or near-field hydrophone measurements or any signal deemed to be representative of the seismic source output. The cross-correlation step 605 may be performed in either the time or frequency domain. In one embodiment, the operation is performed in the frequency domain and then transformed back into the time domain.

Regarding the step 605 of cross-correlation, this step should be understood in a broad sense, i.e., to include other actions than or instead of cross-correlation, as now discussed. For example, the same coherency filtering effect could be obtained if instead of a conventional cross-correlation, a phase only correlation is applied. For this case, the correlation operator has a flat amplitude over the sweep frequency range, but it has the same phase spectrum as the sweep pilot or reference signal. Another option for step 605 is to perform a spectral division frequency by frequency instead of correlation, where the numerator is the received data and the divisor is the reference signal FFT component for that same frequency. A different way to accomplish the same result would be to perform a frequency-time (F-t) transform on the recorded data and then just mute out the direct arrival energy from the seismic source and back transform the data. Still another possibility is to use a masking operator and a pattern recognition scheme to help identify/isolate/target the seismic signal's direct arrival and possible ocean bottom reflections to help with the muting operation. Some of these possibilities are discussed later in more detail.

In step 607, the correlated signals are muted for a fixed time interval, after the arrival of the detected initial source signal arrival, to remove the dominant source signal. The correlation operation will tend to compress the vibrator data and make it look much like an impulsive source. Thus, in case of an impulsive source, the correlation step may be omitted and the method can just mute out the direct arrivals since they will be short pulses. The expected time for the first arrival can be computed knowing the speed of sound in the water and the position of the sensor relative to the source array. In one embodiment, a threshold detector could be used to indicate the first arrival of energy from the source. The mute time may be about 5 s, to allow time for the arrival of the ocean bottom reflection. A tapered mute may be applied to the correlated data over a time window slightly preceding the direct arrival and extending for about 5 s afterward.

In step 609, the muted correlated signals are transformed from the frequency domain to the time domain. For example, the output of step 607 can be Fast Fourier Transformed (FFT) and then divided by the complex conjugate of the FFT of the source signals 603. The result of the spectral division is then inverse FFT (IFFT) to transform the result back to the time domain. Output 610 is a time-domain representation of signals 601, which have been "cleaned,"

i.e., the emitted source signals were removed. In other words, source signature filter 433 acts like a coherency filter, where elements in composite signal 601 that are coherent with the source signal are removed.

A specific implementation of the process discussed in FIG. 6B is now presented. Consider that "h" is a vector containing the received sensor signal sampled data 601 in the time domain, "s" is a vector containing the marine vibrator source signal data 603 in the time domain, "H" is the FFT of h (a representation of h in the frequency domain), "S" is the FFT of s (a representation of s in the frequency domain), and "f" is a frequency index, f=1 . . . NFFT, where NFFT is the number of points in the FFT. With these notations, FFT vectors h and s are given by:

$$H \leftarrow FFT\{h\}$$

$$S \leftarrow FFT\{s\}.$$

Then, step 605 correlates, in the frequency domain, vectors H and S to produce cross-correlation result R, where:

$$R_f = H_f S_f^*,$$

for f=1 . . . NFFT, where $S_f^*$ is the complex conjugate of $S_f$. To produce the time domain representation of R, an IFFT is applied in step 605 as follows:

$$r \leftarrow IFFT\{R\}$$

Then, a mute operator M is applied in step 607 to mute values (can be a tapered mute) in the cross-correlation r, which values correspond to source signal arrivals to create vector u. The mute values can be determined by either some form of threshold detection or by calculation based on expected travel time and/or a combination of both. Thus, vector u is calculated by equation:

$$u \leftarrow M\{r\}.$$

Vector u can be transformed in step 609 to the frequency domain to form vector U as follows:

$$U \leftarrow FFT\{u\}.$$

In step 609, the original sensor signal is restored with the source signal removed in the frequency domain. A term "ϵ", which is a small number, may be used to stabilize the process. In this example, ϵ is shown as a fixed value, but it could be frequency variant. The result of the restoring step 609 is vector C, which does not include a representation of the source signature, i.e., the source signal has been suppressed in vector C, $$C_f = U_f S_f / (S_f S_f^* + \epsilon), \text{ for } f=1 \ldots NFFT.$$

Signal 610 is now ready to be processed by the bio-acoustic processor 429 for detecting the mammal presence. Software algorithms for detecting and identifying the mammals are known in the art, and thus, not discussed herein. Vector C is then converted back to the time domain $$c \leftarrow IFFT\{C\}.$$

The process illustrated in FIG. 6B may be performed continuously, at a given time interval, or repeated whenever a new scan is to be performed. For example, it could be repeated every 1 second, which should be adequate time to detect if a mammal has crossed detection perimeter 323, which is located outside of protection zone 325. For example, the radius of detection perimeter 323 may be 2 km, while the protection zone may have a radius of about 500 m. Those skilled in the art would understand that the protection zone is regulated by various jurisdictions where the survey takes place and the detection perimeter's radius is affected by the placement of the sensors 307.

In another specific embodiment, instead of a mute operator M mentioned in the previous implementation, a window operator W could be used instead to select the source signal arrivals to create a vector v. The window length and position can be determined by either some form of threshold detection or by calculation based on expected travel time and/or a combination of both. Thus vector v is calculated by equation:

$$v \leftarrow W\{r\}.$$

Vector v can be transformed in step 607 to the frequency domain to form vector V as follows:

$$V \leftarrow FFT\{v\}.$$

In the frequency domain, it is possible to back out the correlation operation through spectral division to form a vector D, which contains the frequency domain representation of the source arrival energy and a vector C as before, which contains the frequency domain representation of the bio-acoustic signal received with the seismic source signal contribution removed. Vectors D and C are formed as follows, within step 607:

$$D_f = V_f S_f / (S_f S_f^* + \epsilon), \text{ for } f=1 \ldots NFFT$$

$$C_f = H_f - a_f D_f$$

The term $a_f$ is set to unity for $f \in F_{sweep}$, and zero elsewhere, where $F_{sweep}$ is the set of frequency indices that correspond to frequencies that fall within the sweep signal frequency range. In this implementation, frequencies outside the sweep signal frequency range are untouched and only signals that fall inside the seismic signal frequency range that are coherent with the sweep signal are removed. In another embodiment, the weighting term $a_f$ could have values between zero and one for a smooth transition through frequencies just outside the sweep frequency range. This alternative implementation may create fewer artifacts outside the sweep frequency range the previous embodiment. Signal 610 can be IFFT'd and passed as before to the bio-acoustic processor 629.

Those skilled in the art would recognize that this and other implementations for removing source signals from recorded data, for separating the bio-acoustic data, could be used in conventional seismic acquisition systems that are equipped with separate bio-acoustic sensors. In other words, the high-accuracy, low-bandwidth seismic signal that also contains some low-frequency bio-acoustic signals could be processed so as to form vector D, which is the frequency domain representation of the received seismic signal. That signal could be IFFT'd to form its time domain representation d. Subsequently, because the bio-acoustic signal is sampled at a higher rate, d could be interpolated/resampled and corrected for any differences in sensor response, position or acquisition filters and then subtracted from the bio-acoustic received signal to provide a bio-acoustic signal with the seismic source signal contribution removed.

A similar procedure could be used to remove other signals that might mask cetacean signals. These other signals may include, for example, ship engine or propeller noise, whose signal could be measured close to the device of interest. These signals can be removed from the seismic sensos signals within the bio-acoustic sensor system.

Figure 7A:
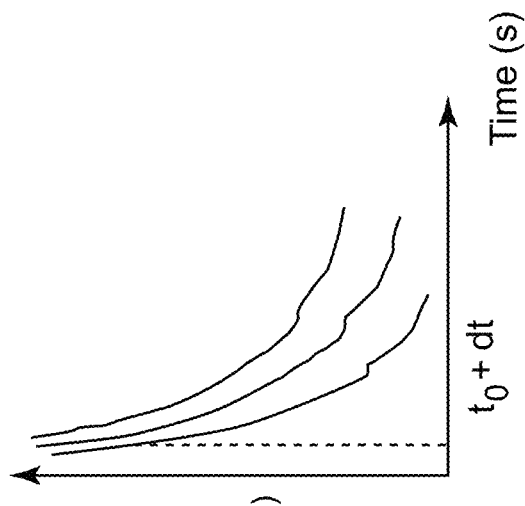
FIGS. 7A-B illustrate a signal deformation introduced by an acoustic channel in water.
Figure 7B:
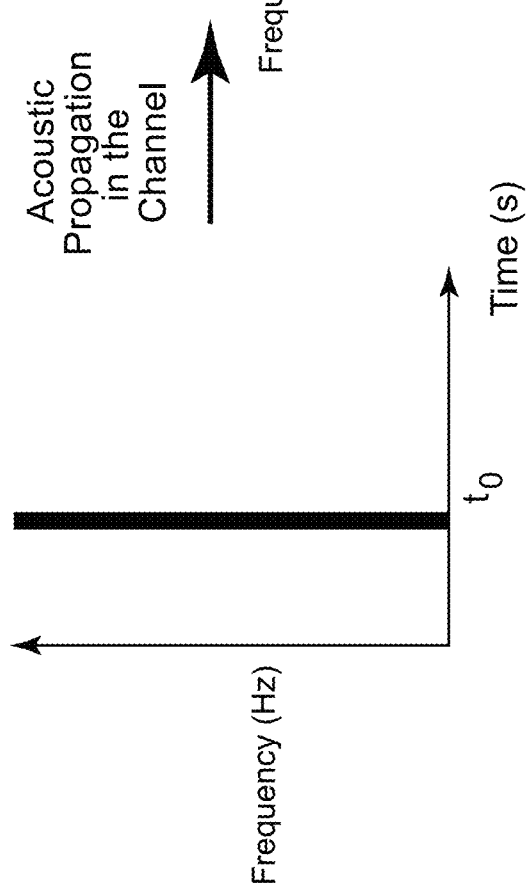

For example, for low frequencies and for the shallow water environment, there is a signal deformation (modal dispersion) associated with the propagation of a seismic signal in water as discussed next with regard to FIG. 7A. For high frequencies, the signal deformation (known as multipath propagation) it is discussed with regard to FIG. 8A. As illustrated in FIG. 7A, an impulsive source can be assumed to generate energy that covers a large range of frequencies at an instant to. However, due to the acoustic propagation of the energy in water (called herein acoustic channel), a signal deformation is observed as illustrated in FIG. 7B Note that the dispersion effect observed in FIG. 7B is similar to a signal received from a non-impulsive source, e.g., a vibratory source. It is noted that the frequencies associated with the seismic source are now spread in time. The signals noted in FIG. 7B happen to be very similar to some of the sounds emitted by the mammals. For this reason, some of the recorded seismic data may in fact appear as mammal's presence, creating a false positive.

The spread of the signals shown in FIG. 7B can be evaluated and/or calculated based on a theoretical model when the characteristics of the acoustic channel are known. For example, the data necessary for modeling the acoustic channel is the sound velocity profile of the water column. This information can be measured in the field or estimated (inversion) or taken from an existing database on the area. By modeling the acoustic channel, it possible to correct the recorded data to remove possible false positives about the presence of the mammals when this data is analyzed by the bio-acoustic processor. In other words, the bio-acoustic processor may correct the recorded data received for processing before determining a presence of the mammal to remove false positives introduces by the seismic data.

Figure 8A:
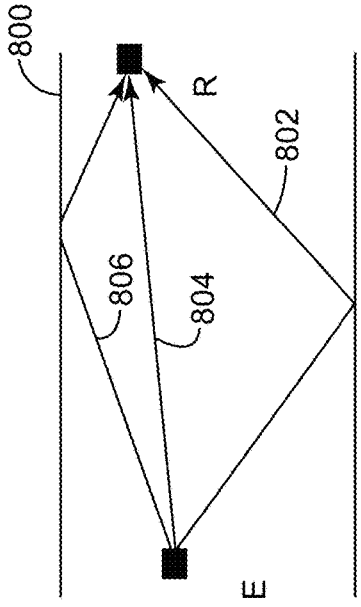
FIGS. 8A-C illustrate the influence of multi-paths on mammal detection.
Figure 8C:
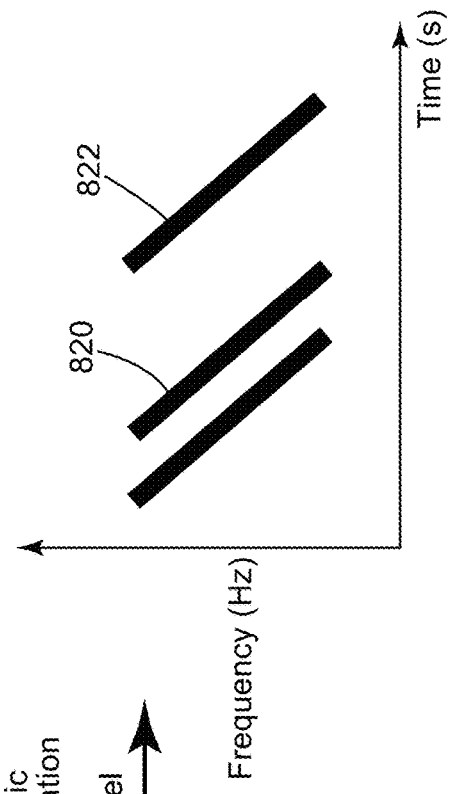
Figure 8B:
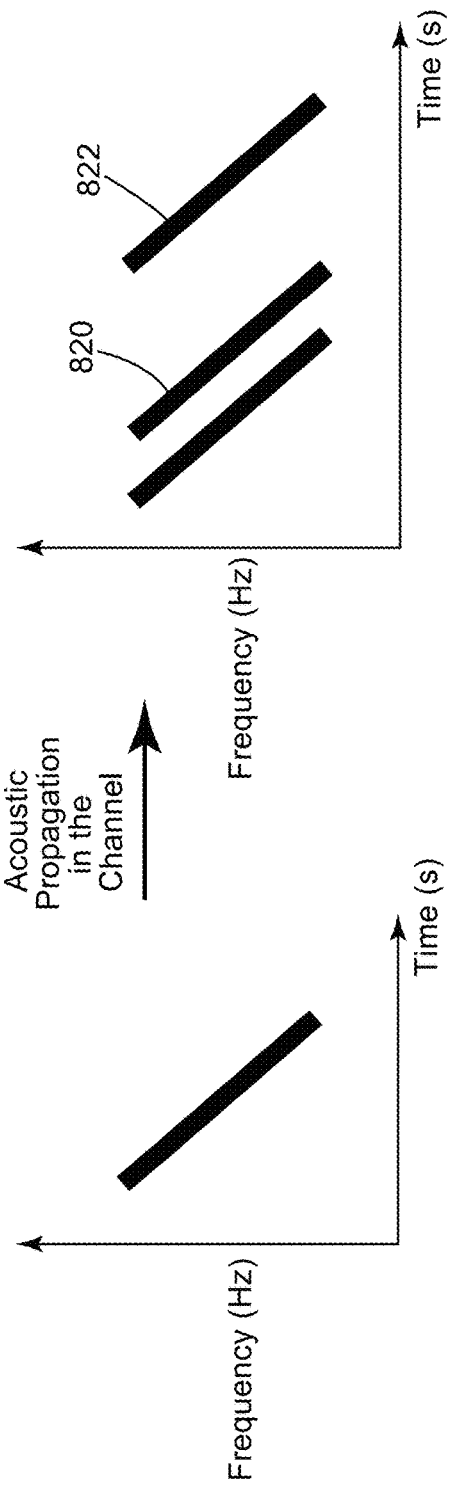

Another source of false positive for mammal analysis is the presence of multiple paths (called multiples herein), which are illustrated in FIGS. 8A-C. In this regard, FIG. 8A shows an emitter E and a receiver R distributed below the water surface 800. When the emitter E (e.g., marine source) emits sound energy, it propagates along multiple paths 802, 804 and 806 to the receiver R (note that this figure shows for simplicity these paths; however, the paths may be more complex, including path bending due to the sound speed gradient). FIG. 8B illustrates the output of the seismic source while FIG. 8C illustrates the energy received at the receiver. It is noted that energy 820 and 822 received at the receiver R and associated with paths 804 and 806 possible obstructs the presence of mammal information. Thus, the energy associated with paths 804 and 806 is undesirable and needs to be removed, or filtered out.

Figure 9:
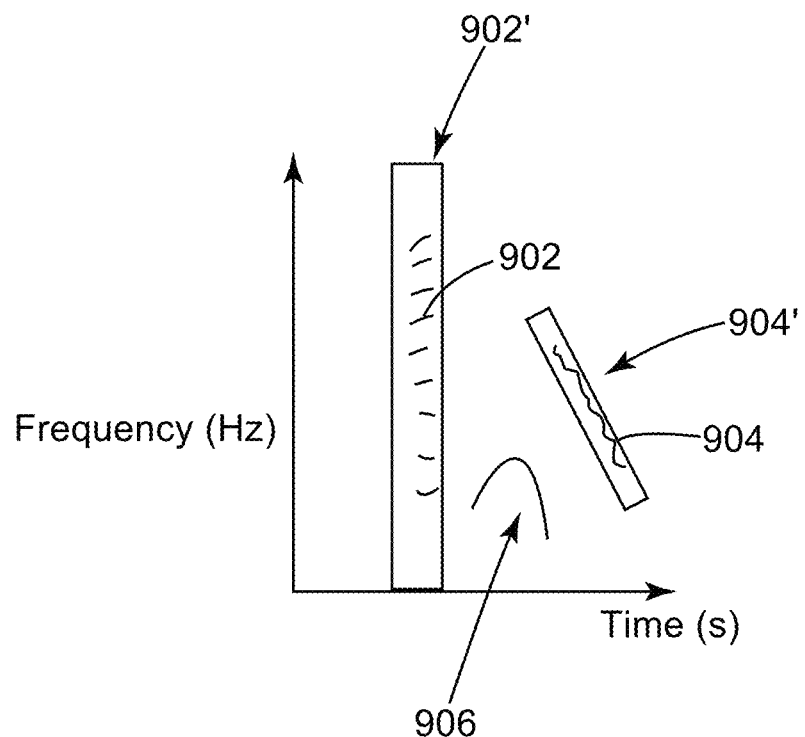
FIG. 9 illustrates a method of applying a mask in a frequency-time domain for filtering out the source signature.

FIG. 9 illustrates the recorded data in the frequency-time domain, with energy 902 corresponding to an impulsive source, energy 904 corresponding to a vibratory source, and energy 906 corresponding to a mammal. By transforming the recorded data into the frequency-time domain, these types of energy get separated from each other, which in the time domain is not the case. Then, a mask 902' or 904' (the mask can have any shape in the time-frequency domain) may be designed, depending on which kind of seismic source is present, to filter out the energy associated with seismic source. In this way, the accuracy of the bio-acoustic signal associated with energy 906 is increased. This processing may be implemented in the bio-acoustic processor 429 in FIGS. 4A and 4B.

Figure 10:
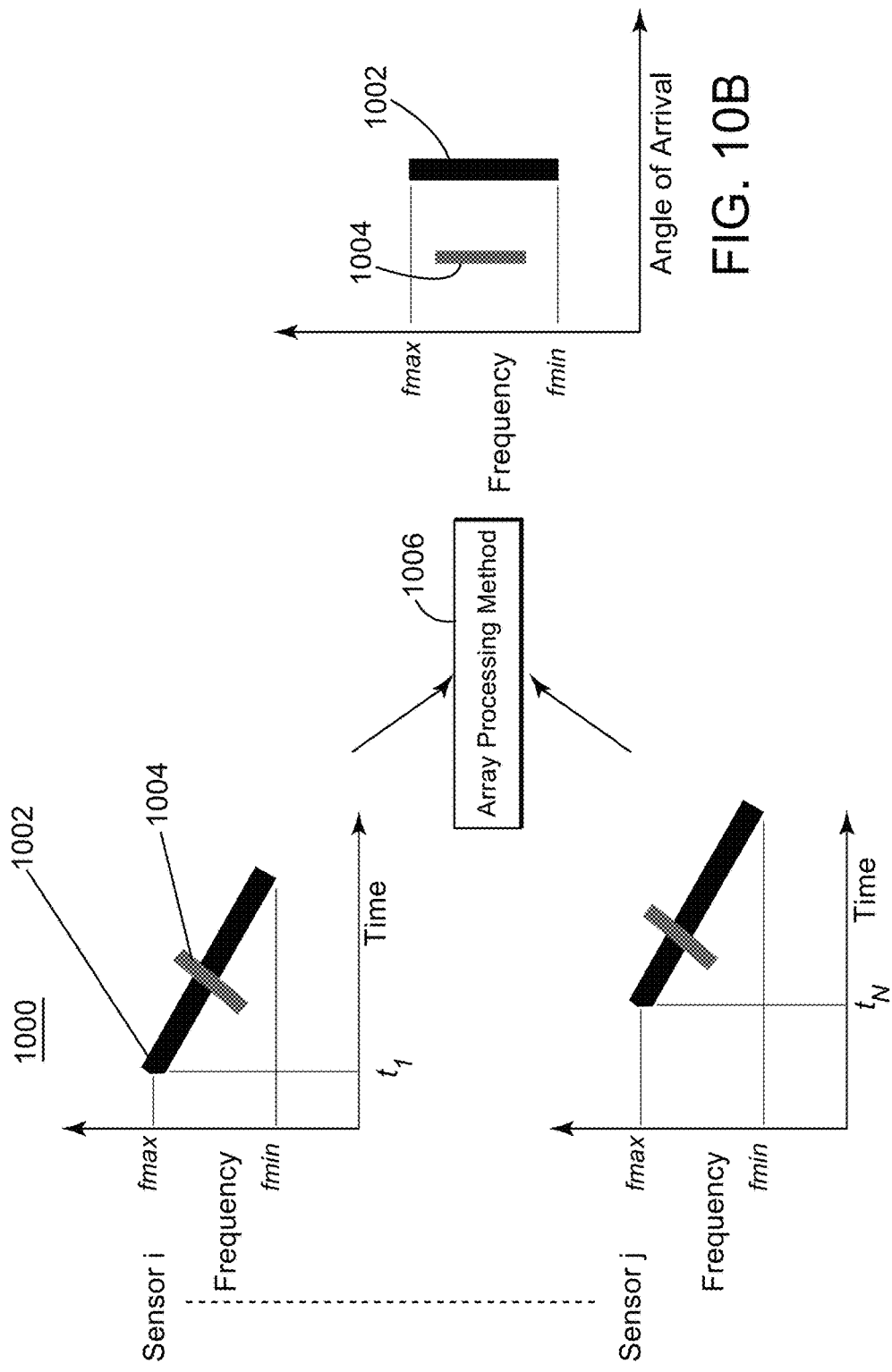
FIGS. 10A-B illustrate a method of transforming the data in an angle dependent domain for filtering out the source signature.

Still another option for filtering out the source signature associated with recorded data that includes bio-acoustic signals is discussed with the embodiment illustrated in FIGS. 10A-B. FIG. 10A illustrates synthetic data that is used to simulate data recorded with seismic sensors during a marine seismic survey. This data, as already discussed above, includes both seismic data 1002 and bio-acoustic data 1004. FIG. 10A shows this data for the two different seismic sensors i and j. Now consider that the bio-acoustic data 1004 has been emitted by a mammal, at the same time and in the same frequency range as the seismic data 1002. The data 1000, after being processed with an array processing method 1006, may be plotted in the frequency-wavenumber, as illustrated in FIG. 10B. The mammal's output 1004 is now clearly seen distinct from the seismic source signature 1002, and thus, the source signature can be filtered out with an appropriate mask. Note that the wavenumber is related to the angle of arrival of the array and for this reason it is advantageous to transform the data in the frequency-wavenumber domain. The angle of arrival is possible to be calculated when a large number of sensors is used, which is the case with the seismic sensors on a streamer. To transform the input data 1000 into the frequency-wavenumber domain, an array processing technique (e.g., beam forming) can be applied. The beam forming technique is known in the art and thus, not repeated herein. However, note that an array processing technique may use other transforms than the frequency-wavenumber discussed above and those skilled in the art would know to use any such technique instead of the frequency-wavenumber transform.

Knowing the angle from which the source's energy is arriving at the seismic sensor, and assuming that the mammal is not located where the source is located, it is possible to mask those angles, as illustrated in FIG. 10D, which correspond to arrival angle of the source's energy. In this way, the energy associated with the source can be removed so that only the bio-acoustic data is analyzed by the bio-acoustic processor for increasing the accuracy of determining the mammal's presence. Note that the above methods may be applied to remove not only energy associated with the seismic source, but with other sources as well, for example, another vessel, another source, etc.

Further, note that the above methods may be used to remove the mammal data from the recorded data to improve the seismic data. In other words, knowing the angle of arrival of the marine mammal (or the signal itself), this signal can also be removed from the seismic data. Thus, the seismic data is denoised from the "pollution" introduced by the presence of the marine mammal signal.

The processing system 400 shown in FIGS. 4A and 4B may be distributed between the streamers and the vessel towing the streamers. According to an embodiment illustrated in FIG. 11, processing system 1100 (has similar reference numbers as processing system 400 in FIGS. 4A and 4B) has processing channels 1114 and splitters 1116 located inside streamers 1160 (only one streamer is shown for simplicity, but those skilled in the art know that a vessel can tow up to 30 streamers, with the number of streamers increasing with the advance of technology). More specifically, each streamer 1160 includes plural processing channels 1114 and plural corresponding splitters 1116. Streamer 1160 also includes N plural groups of sensors 1101. In one embodiment, the number of processing channels corresponds to the number of N plural groups. However, in another embodiment the number of processing channels corresponds to the number of individual sensors distributed in the streamer. Filters 1117, data buffers 1121 and 1125 and processors 1123 and 1129 may be located on the vessel. In another embodiment, filters 1117 may also be located on the streamer. As the miniaturization of the storage devices and processors continues, it would be possible to place the entire processing device on the streamer. However, the manufacturer of these elements has the freedom to also place the entire processing system on the vessel. The inventors of this application believe that distributing the processing system on the streamers and the vessel is more advantageous.

Figure 11:
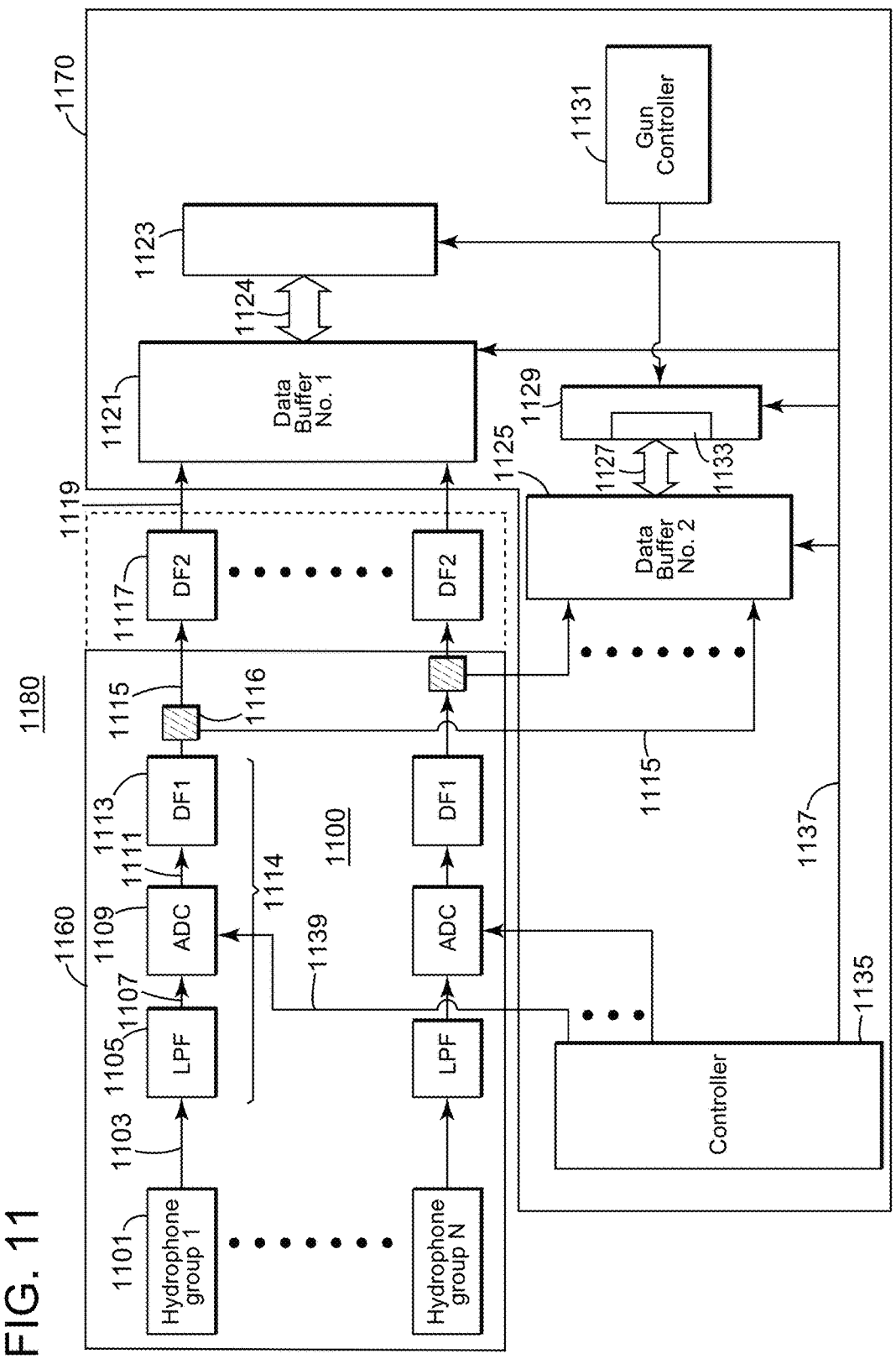
FIG. 11 illustrates the distribution of the processing system on the streamer and/or vessel.

Although FIG. 11 shows the processing channels being in parallel, it is possible to have them in series. For example, if the sensor group N is located at the tail of the streamer, the processing channel N may be located in the streamer, between sensor group N and sensors group N-1. The output of filter 1113 may be encoded and sent to processing channel N-1, with an instruction to not be processed by any other processing channel. In this way, data from the various sensor groups is sent along a same path and thus, the processing channels 1114 are distributed in series. Splitters 1116 would be configured to not only split the data but also separate the outputs from the various processing channels. Encoding methods for achieving these functions are known in the art, for example, Direct-Sequence Spread Spectrum (DSSS), Code Division Multiple Access (CDMA), Frequency Division Multiple Access (FDMA), Space-Division Multiple Access (SDMA) or other known methods.

FIG. 11 schematically shows a vessel 1170 that tows streamer 1160. Streamer 1160 includes sensors 1101 and part of the processing system 1100 while vessel 1170 hosts the other part of the processing system 1100 and source controller 1131. All these elements form a seismic acquisition system 1180.

Figure 12:
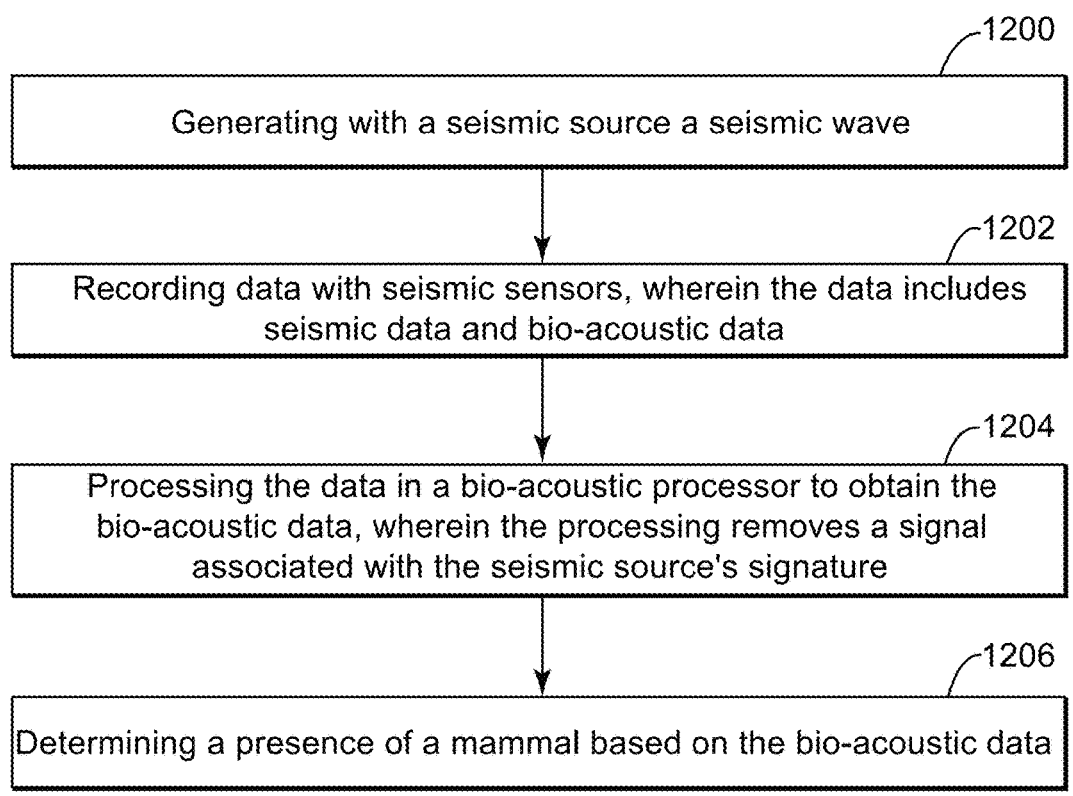
FIG. 12 is a flowchart of a method for processing seismic data and bio-acoustic data recorded simultaneously with the same seismic sensors.

According to an embodiment illustrated in FIG. 12, there is a method for acquiring seismic data while a mammal is detected. The method includes a step 1200 of generating with a seismic source a seismic wave, a step 1202 of recording data with seismic sensors, where the data includes seismic data and bio-acoustic data, a step 1204 of processing the data in a bio-acoustic processor to obtain the bio-acoustic data, where the processing removes a signal associated with the seismic source's signature, and a step 1206 of determining a presence of a mammal based on the bio-acoustic data.

The method may also include a step of verifying whether the mammal is in the alert area 325 and, if yes, a step of alerting the operator and/or a step of taking mitigation action to protect the mammal, e.g., by deterring the mammal, deviating the course of the vessel, stopping the shooting, etc.

Figure 13:
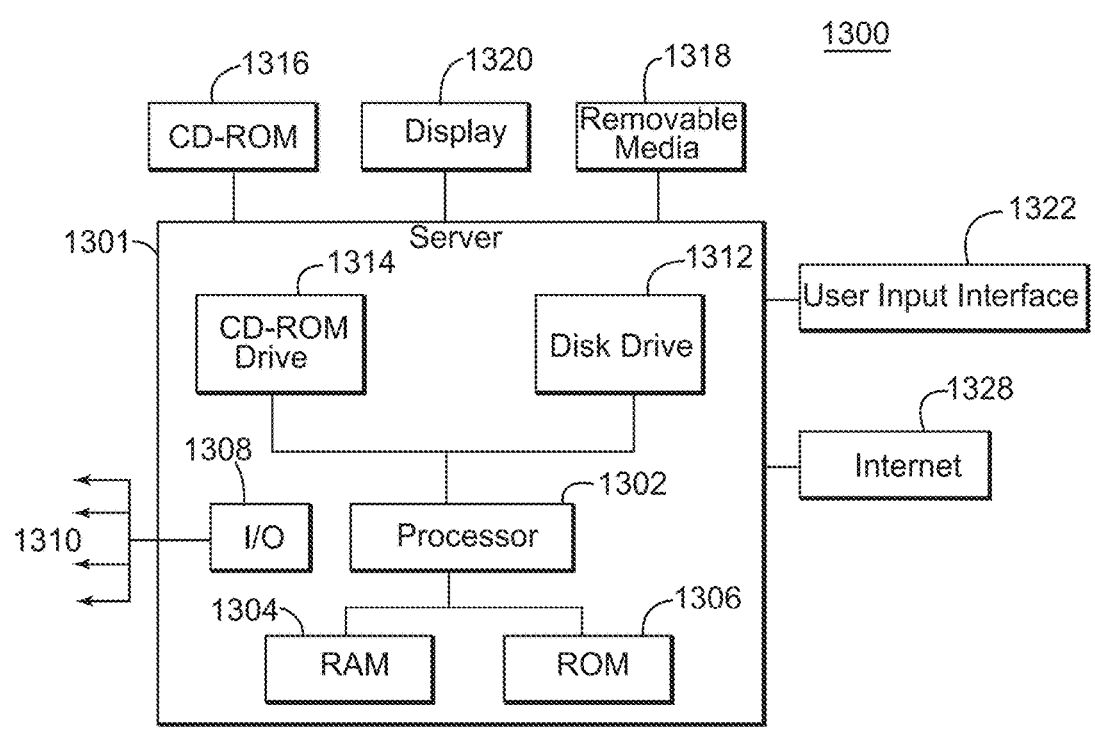
FIG. 13 is a schematic diagram of a computing device that implements the method discussed above.

The above method and others may be implemented in a computing system specifically configured for seismic acquisition. An example of a representative computing system capable of carrying out operations in accordance with the exemplary embodiments is illustrated in FIG. 13. This computing system may be associated with any of the processors and/or controllers illustrated in FIGS. 4A and 7. In one embodiment, a single computing system hosts all the processors and controllers shown in FIGS. 4A and 7. Hardware, firmware, software or a combination thereof may be used to perform the various steps and operations described herein.

The exemplary computing system 1300 suitable for performing the activities described in the exemplary embodiments may include a server 1301. Such a server 1301 may include a central processor (CPU) 1302 coupled to a random access memory (RAM) 1304 and to a read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals and the like. The processor 1302 carries out a variety of functions as are known in the art, as dictated by software and/or firmware instructions.

The server 1301 may also include one or more data storage devices, including a hard drive 1312, CD-ROM drives 1314, and other hardware capable of reading and/or storing information such as DVD, etc. In one embodiment, software for carrying out the above-discussed steps may be stored and distributed on a CD- or DVD-ROM 1316, removable memory device 1318 or other form of media capable of portably storing information. These storage media may be inserted into, and read by, devices such as the CD-ROM drive 1314, the disk drive 1312, etc. The server 1301 may be coupled to a display 1320, which may be any type of known display or presentation screen, such as LCD, LED displays, plasma displays, cathode ray tubes (CRT), etc. A user input interface 1322 is provided, including one or more user interface mechanisms such as a mouse, keyboard, microphone, touchpad, touch screen, voice-recognition system, etc.

The server 1301 may be coupled to other computing devices, such as landline and/or wireless terminals via a network. The server may be part of a larger network configuration as in a global area network (GAN) such as the Internet 1328, which allows ultimate connection to various landline and/or mobile client devices. The computing device may be implemented on a vehicle that performs a land seismic survey. In one application, computing system 1300 is a dedicated system that is tailored for being deployed on vessel, and also for interacting with the navigation system of the vessel.

The disclosed exemplary embodiments provide a system and a method for detecting marine mammals and mitigating the impact of sound waves on them. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine seismic processing system comprising:
   an interface for receiving recorded data, wherein the recorded data includes seismic data and bio-acoustic data;
   a seismic data processor for estimating a source signature from the recorded data, wherein the source signature is associated with a seismic source that emits seismic waves in water during a seismic survey; and
   a bio-acoustic processor that estimates a presence of a mammal generating the bio-acoustic data, based on a processed signal obtained by removing from the recorded data energy coherent with the source signature.

2. The system of claim 1, wherein the recorded data includes signals having a frequency between 1 and 200 kHz.

3. The system of claim 1, wherein the source signature is cross-correlated with the recorded data for obtaining the processed signal.

4. The system of claim 1, wherein the seismic data processor or the bio-acoustic data processor is configured to transform the recorded data in a frequency-time domain and apply at least one mask for removing the source signature.

5. The system of claim 1, wherein the seismic data processor or the bio-acoustic data processor is configured to,
apply a beam forming process to determine an angle of acoustic waves generated by the seismic source and received by seismic sensors,
transform the recorded data from the time-space domain to an angle-dependent domain, and
apply a filter at the angle of the acoustic waves arriving from the seismic source.

6. The system of claim 1, wherein the seismic data processor or the bio-acoustic data processor is configured to process the recorded data to account for signal deformation that takes place in water.

7. The system of claim 1, wherein the recorded data is recorded with a single set of seismic sensors.

8. The system of claim 1, wherein the recorded data is recorded with a first set of seismic sensors and with a second set of bio-acoustic sensors.

9. The system of claim 1, further comprising:
plural processing channels for receiving and conditioning the recorded data; and
plural splitters for splitting outputs of the processing channels into first and second streams,
wherein the seismic data processor processes the first streams, and
the bio-acoustic processor processes the second streams to detect a presence of a mammal.

10. The processing system of claim 1, wherein the bio-acoustic processor comprises:
a source signature filter module configured to receive the second streams and to remove a source signature associated with a seismic source that generates sound waves.

11. The processing system of claim 1, wherein the bio-acoustic processor is configured to determine the presence of the mammal and identify the type of mammal based on the processed signal.

12. The processing system of claim 1, wherein the bio-acoustic processor communicates with a seismic source controller.

13. A seismic acquisition system comprising:
at least one streamer;
seismic sensors distributed along the at least one streamer and configured to record data; and
a processing system including a seismic data processor and a bio-acoustic processor,
the seismic data processor estimating a source signature from the recorded data, wherein the source signature is associated with a seismic source that emits seismic waves in water during a seismic survey, and
the bio-acoustic processor estimating a presence of a mammal generating bio-acoustic data, based on a processed signal obtained by removing from the recorded data energy coherent with the source signature.

14. The system of claim 13, wherein the source signature is cross-correlated with the recorded data for obtaining the processed signal.

15. The system of claim 13, wherein the seismic data processor or the bio-acoustic data processor is configured to transform the recorded data in a frequency-time domain and apply at least one mask for removing the source signature.

16. The system of claim 13, wherein the seismic data processor or the bio-acoustic data processor is configured to,
apply a beam forming process to determine an angle of acoustic waves generated by the seismic source and received by seismic sensors,
transform the recorded data from the time-space domain to an angle-dependent domain, and
apply a filter at the angle of the acoustic waves arriving from the seismic source.

17. The system of claim 13, wherein the seismic data processor or the bio-acoustic data processor is configured to process the recorded data to account for signal deformation that takes place in water.

18. The system of claim 13, wherein the bio-acoustic processor comprises:
a source signature filter module configured to receive the second streams and to remove a source signature associated with a seismic source that generates sound waves.

19. A method for detecting a mammal during acquisition of seismic data, the method comprising:
generating with a seismic source a seismic wave;
recording data with seismic sensors, wherein the data includes seismic data and bio-acoustic data;
processing the data in a bio-acoustic processor to obtain the bio-acoustic data, wherein the processing removes energy coherent with the seismic source's signature; and
determining a presence of a mammal based on the bio-acoustic data.

20. The method of claim 19, further comprising:
alerting a vessel's operator when the mammal is detected; and
taking a mitigation action to reduce exposure to the seismic waves of the mammal.

* * * * *